United States Patent [19]

Kramer et al.

[11] Patent Number: 4,617,044

[45] Date of Patent: Oct. 14, 1986

[54] METHOD FOR FORMING GLASS-TO-METAL SEALS

[75] Inventors: Daniel P. Kramer, Dayton; Richard T. Massey, Hamilton, both of Ohio

[73] Assignee: The United States of America as represented by the United States Department of Energy, Washington, D.C.

[21] Appl. No.: 769,210

[22] Filed: Aug. 26, 1985

[51] Int. Cl.⁴ .............................................. C03C 27/02
[52] U.S. Cl. ........................................ 65/49; 65/59.1; 65/59.22
[58] Field of Search .................... 65/59.1, 59.22, 59.24, 65/59.25, 59.32, 49, 50

[56] References Cited

U.S. PATENT DOCUMENTS

| | | | |
|---|---|---|---|
| 2,073,254 | 3/1937 | Redman | 65/49 |
| 3,335,462 | 8/1967 | Grigull et al. | 18/30 |
| 3,773,454 | 11/1973 | Horve et al. | 425/242 |
| 4,000,110 | 12/1976 | Saito et al. | 264/63 X |
| 4,412,804 | 11/1983 | Huether | 425/584 X |

Primary Examiner—Arthur Kellogg
Attorney, Agent, or Firm—Armand McMillan; Albert Sopp; Judson R. Hightower

[57] ABSTRACT

A method for forming a glass-to-metal seal in which the glass has a higher melting point than the metal. The molten glass is vacuum injection molded onto the metal, thus melting a very thin layer of the surface of the metal long enough to form a seal, but not long enough to cause a distortion in the shape of the metal component.

4 Claims, 1 Drawing Figure

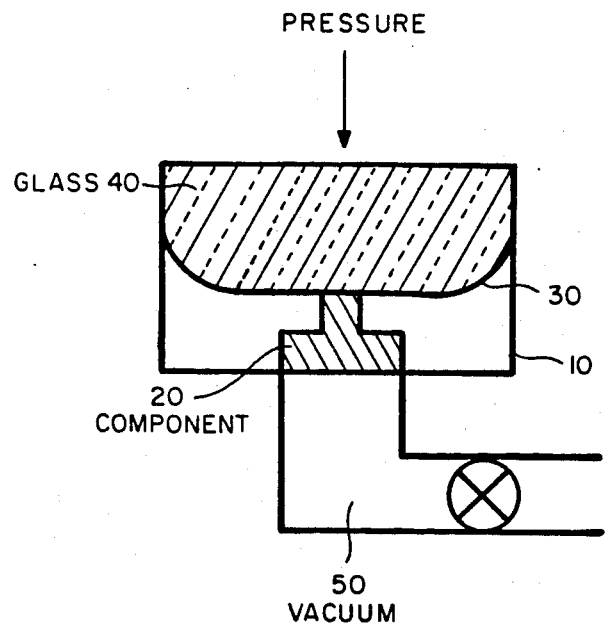

METHOD FOR FORMING GLASS-TO-METAL SEALS

The United States Government has rights in this invention pursuant to Contract No. DE-AC04-76DP00053 between the United States Department of Energy and Monsanto Research Corporation.

BACKGROUND OF THE INVENTION

The classical fabrication of glass-to-metal or glass-ceramic-to-metal seals includes a time-temperature furnace cycle during which glass or glass-ceramic softens or melts and flows onto the metal parts, thus producing the seal. In some cases, when gravity alone cannot successfully form the seal, weights are applied to the glass piece or preform in order to increase its flow. In any event, the formation of the seal has always relied upon the use of a glass or glass-ceramic which has a melting temperature lower than that of the metal piece with which it forms the seal.

The constraint that the glass or glass-ceramic have a lower melting temperature than that of the metal to which it is sealed has led to extensive work in the development of glasses having low melting temperatures for sealing to metals having low melting temperatures. This has led to the use of more and more exotic materials, with concomitant compromises in the satisfaction of other engineering criteria involving other physical properties of the glass as well as cost and availability.

SUMMARY OF THE INVENTION

The present invention involves a technique for obtaining a glass-to-metal seal utilizing metal parts which have a lower melting point than that of the glass to which they are sealed. It preferably utilizes vacuum injection molding to inject molten glass onto the metal part to form the seal. This method makes available an entire new class of glasses which can be sealed to metals having low melting points. It has also been shown to produce a glass-to-metal seal having excellent leak-tight characteristics.

BRIEF DESCRIPTION OF THE DRAWING

These and other advantages of the method according to the present invention are explained below in conjunction with the accompanying drawing, which is a schematic diagram of the vacuum injection molding process used in conjunction with the method of the invention.

DETAILED DESCRIPTION OF THE PREFERRED EMBODIMENT

The method according to the present invention will be described below with reference to a vacuum injection molding process. It will be understood by one of ordinary skill in the art, however, that the teachings of the invention can be applied to other processes for forming a glass-to-metal seal, and are therefore not restricted to the vacuum injection molding process.

FIG. 1 illustrates a typical vacuum injection molding process. A vacuum injection mold 10 contains a metal component 20. An injection chamber 30 is filled with molten glass 40. The glass is urged to flow over and around component 20 by the use of a piston (not shown) and by vacuum applied on the end of mold 10 opposite injection chamber 30 by means for applying vacuum 50. This will be readily apparent to one of ordinary skill in the art that vacuum applying means 50 may suitably comprise an orifice in the base of mold 10, as well as a pump or other means for creating a vacuum. As depicted in FIG. 1, pressure may also be applied to the top of the glass by means of a piston to accelerate its flow over the component 20.

Component 20 is fabricated of a metal having a low melting point. As an example, component 20 could be fashioned of aluminum, which has a melting point of approximately 660° C. Various other low-melting metals could, however, be selected depending on the ultimate application of component 20. Once the component 20 is placed in the mold, the mold may preferably be heated to a preheat temperature below the melting point of the metal of which the component 20 is made. For example, if component 20 were fashioned of aluminum, the mold may be preheated to, for example, approximately 250° C. It will also be understood by one of ordinary skill in the art that the mold can potentially accommodate several components to be sealed in a single operation, depending on the relative sizes of the mold and the components.

The molten glass 40 is a glass having a glass melting point higher than the metal melting point of the component 20. For example, the glass could be a multi-component lithia-alumina-silica glass which has a melting temperature of approximately 960° C. It is preferable to heat the glass in excess of the glass melting temperature to ensure complete flow through the mold and onto the metal. If the lithia-alumina-silica glass just mentioned is used, the glass may be heated to, for example, about 1,250° C. During the seal operation, the glass is poured from a crucible into the injection chamber 30 in the center of mold 10. The glass 40 is then injected onto component 20 by the action of a piston (not shown). Even though the molten glass 40 initially contacts component 20 at temperatures in excess of the melting point of the metal of which component 20 is made, component 20 will not melt or change shape because the mold acts as a giant heat sink and very quickly lowers the temperature of molten glass 40 below the metal melting point of component 20. The brief period during which the temperature of glass 40 exceeds the melting point, however, is sufficient to produce an excellent glass-to-metal seal.

Aluminum-to-glass seals have been fabricated using the technique and some of their properties have been measured. Helium leak tests have shown that excellent leak-tight seals ($<10^{-8}$ cc/sec He) have been produced. In addition, the strength of these seals in certain configurations has been measured hydrostatically. In some cases, the strength of the seal has been known to be stronger than the aluminum body since the aluminum sheared at 40,000 psi, before the failure of the aluminum-to-glass seal.

These tests indicate that, for the first time, a good, reliable glass-to-metal seal has been fabricated using metal parts which have a lower melting point than that of the glass to which they are sealed. This advantageously creates new freedom in the selection of numerous combinations of materials without compromising other design criteria.

The method of the invention has been described above in terms of an illustrative process using illustrative materials. It will be readily apparent to one of ordinary skill in the art, however, that the teachings of the invention may be applied to other processes and materials. Therefore, the invention should not be regarded as being limited to the process and materials used to describe it above, but rather as fully commensurate in scope with the following claims.

What is claimed is:

1. A method for forming a glass-to-metal seal, comprising the steps of:
   (a) placing in a vacuum injection mold a formed metal part to be sealed;
   (b) heating a glass having a melting point greater than the melting point of said metal to a temperature greater than said glass melting point, thus melting said glass;
   (c) vacuum injecting said molten glass into said mold to effect the seal.

2. A method as in claim 1, further comprising, prior to injecting said molten glass into said mold, the step of preheating said mold to a temperature lower than said metal melting point.

3. A method as claimed in claim 1, wherein said metal is aluminum, said glass is a lithia-alumina-silica glass having a glass melting point of 960° C., and said glass temperature is about 1,250° C.

4. A method as claimed in claim 2, wherein said metal is aluminum, said glass is a lithia-alumina-silica glass having a glass melting point of about 960° C., said glass temperature is about 1,250° C., and said mold preheat temperature is about 250° C.

* * * * *